INVENTORS.
JOHN F. SALKO
STANLEY KOZAK
BY Bosworth, Sessions
Herretron & Cain
ATTORNEYS.

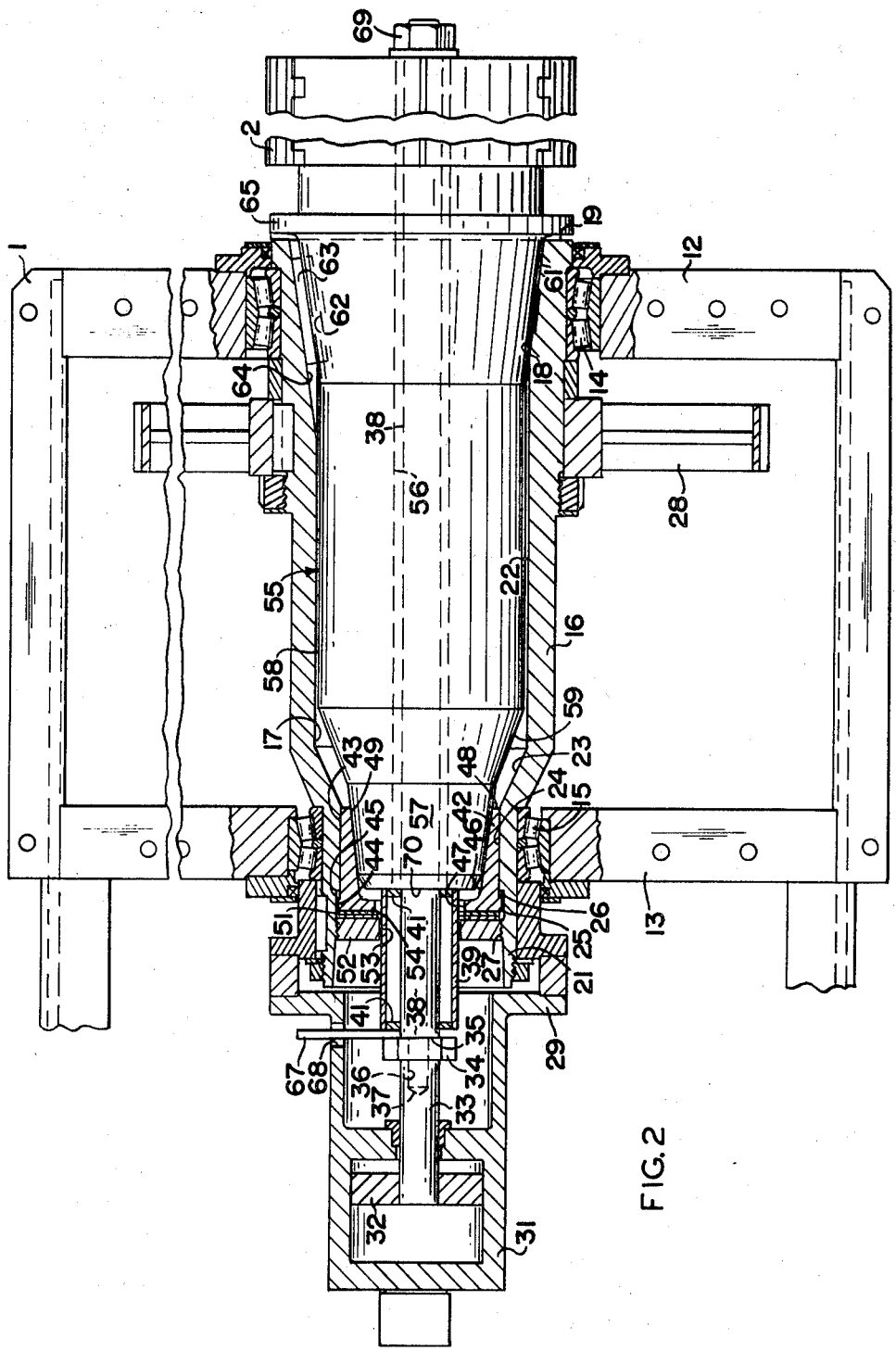

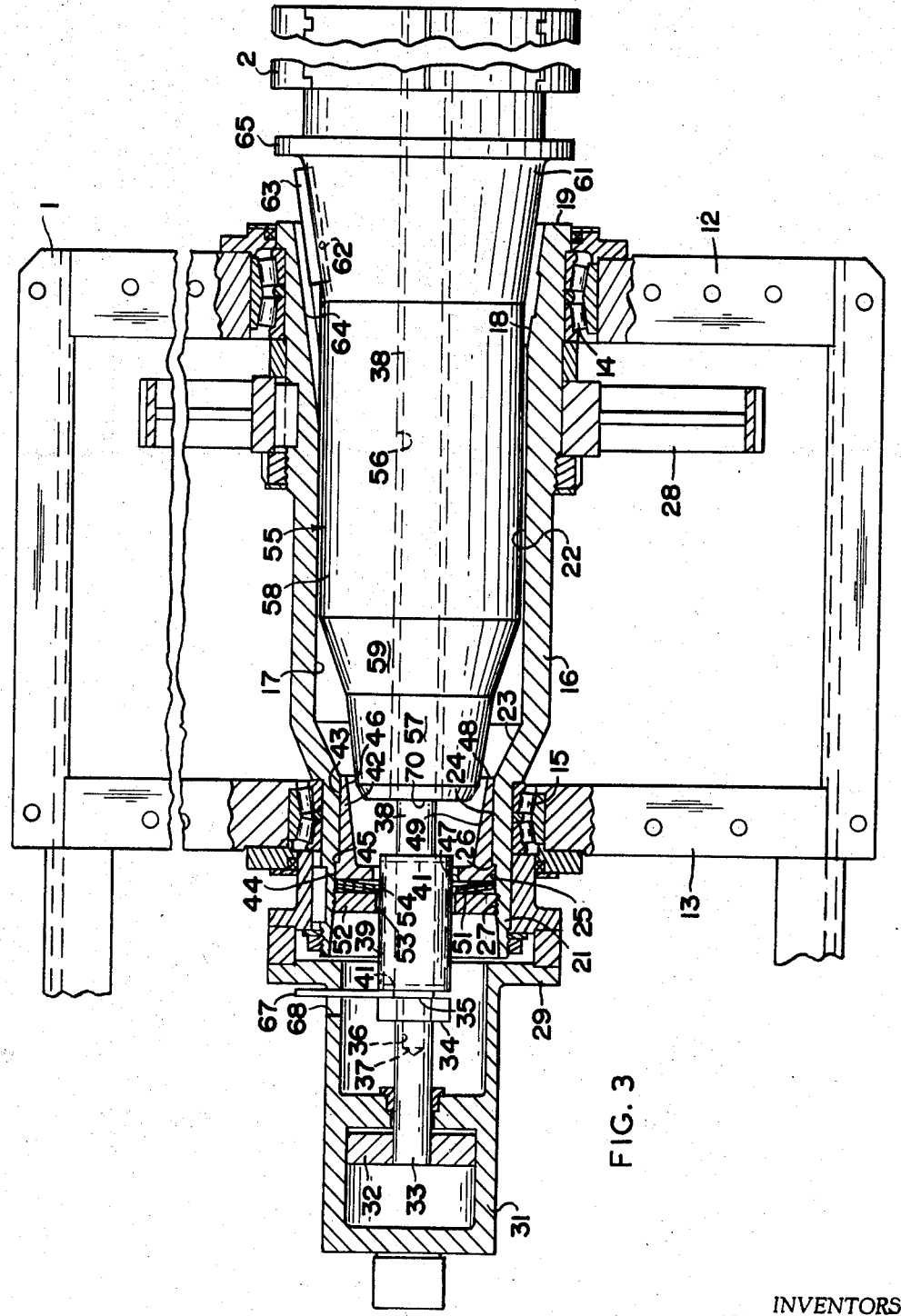

United States Patent Office 3,549,443
Patented Dec. 22, 1970

3,549,443
QUICK-CHANGE SPINDLE FOR REELS
John F. Salko, Beaver, and Stanley Kozak, Ellwood City, Pa., assignors to Blaw-Knox Company, Pittsburgh, Pa., a corporation of Delaware
Filed Sept. 25, 1968, Ser. No. 762,542
Int. Cl. B21c 47/02
U.S. Cl. 242—78.1          5 Claims

ABSTRACT OF THE DISCLOSURE

A quick-change spindle for the drums of pay-off and take-up reels for coils of metal strip. The spindle is supported by a quill that is provided with a bore that tapers outwardly at its front end and that has a tapered retainer at its rear end. The spindle has a corresponding taper that engages the taper at the front end of the quill and a tapered nose portion that engages within the tapered retainer.

SPECIFICATION

This invention relates to pay-off and take-up reels for coils of metal strip and more particularly to reels in which the coil-carrying drums may be easily and rapidly changed. The reels can thus be adapted to coils having central openings of different diameters and drums can readily be replaced in case of wear or damage.

BACKGROUND OF THE INVENTION

It has been proposed to provide pay-off and take-up reels with interchangeable drums of various sizes. Each drum is supported by a drum spindle that is inserted into a female quill retained in the gear box of a conventional pay-off or take-up reel. The female quill is rotatably mounted within the gear box and a gear is secured to it in order that the rotation of the quill may be positively controlled. The quill bore is provided with cylindrical and conical portions and has an annular flange at its front end (i.e., the end nearest the coil). The drum spindle is of a configuration corresponding to the configuration of the bore of the quill in order that the drum spindle may be inserted into the bore of the female quill in surface to surface contact throughout a substantial portion of its exterior surface. Once the spindle has been seated in the quill it is fastened into place by bolts through its flange and the quill flange. A pull rod extends through the bore of the spindle and is adapted to be reciprocated by a hydraulic piston in order that the drum segments may be opened or closed to release or grip the metal coil in the conventional manner.

Difficulties have arisen in the use of this arrangement. To remove the spindle from the quill for a change in drum size, it is necessary with the prior art devices to remove the bolts holding the spindle in place. Jack blocks are then used to break the spindle free from the quill. During the removal of the drum spindle from the quill, care must be taken to insure that the spindle remains in complete alignment with the bore of the quill otherwise the spindle will score the quill. Interchange of drums with devices of this type is difficult and time consuming.

SUMMARY OF THE INVENTION

It is therefore an object of the present invention to provide means for rapidly removing and replacing the drums of pay-off and take-up reels. A further object of this invention is to provide a drum spindle and quill design which avoids the difficulties of the prior art devices.

According to the present invention, the drum spindle is provided with tapering nose and drum end portions joined by a body portion. The female quill is adapted to receive in its rear bore portion a retainer having a tapering bore corresponding to the taper of the spindle nose. The front portion of the quill bore tapers outwardly to receive in surface to surface contact the spindle drum end portion. To assist in the removal of the spindle from the quill, the retainer is spring loaded.

DESCRIPTION OF THE DRAWINGS

Other objects and advantages of this invention will become apparent from the following detailed description of a preferred embodiment of this invention when taken in conjunction with the drawings wherein:

FIG. 2 is a cross-sectional elevational view of the drum spindle and quill of this invention;

FIG. 3 is a cross-sectional elevational view of the apparatus of FIG. 2 in a partially disassembled position.

DESCRIPTION OF A PREFERRED EMBODIMENT

Figure 1:
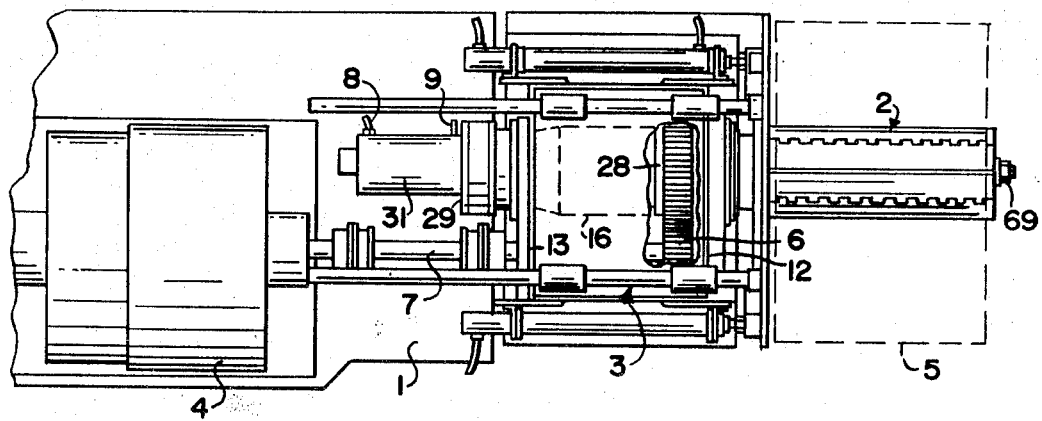
FIG. 1 is a plan view, with parts broken away, of a power driven take-up reel embodying the present invention.
Figure 4:
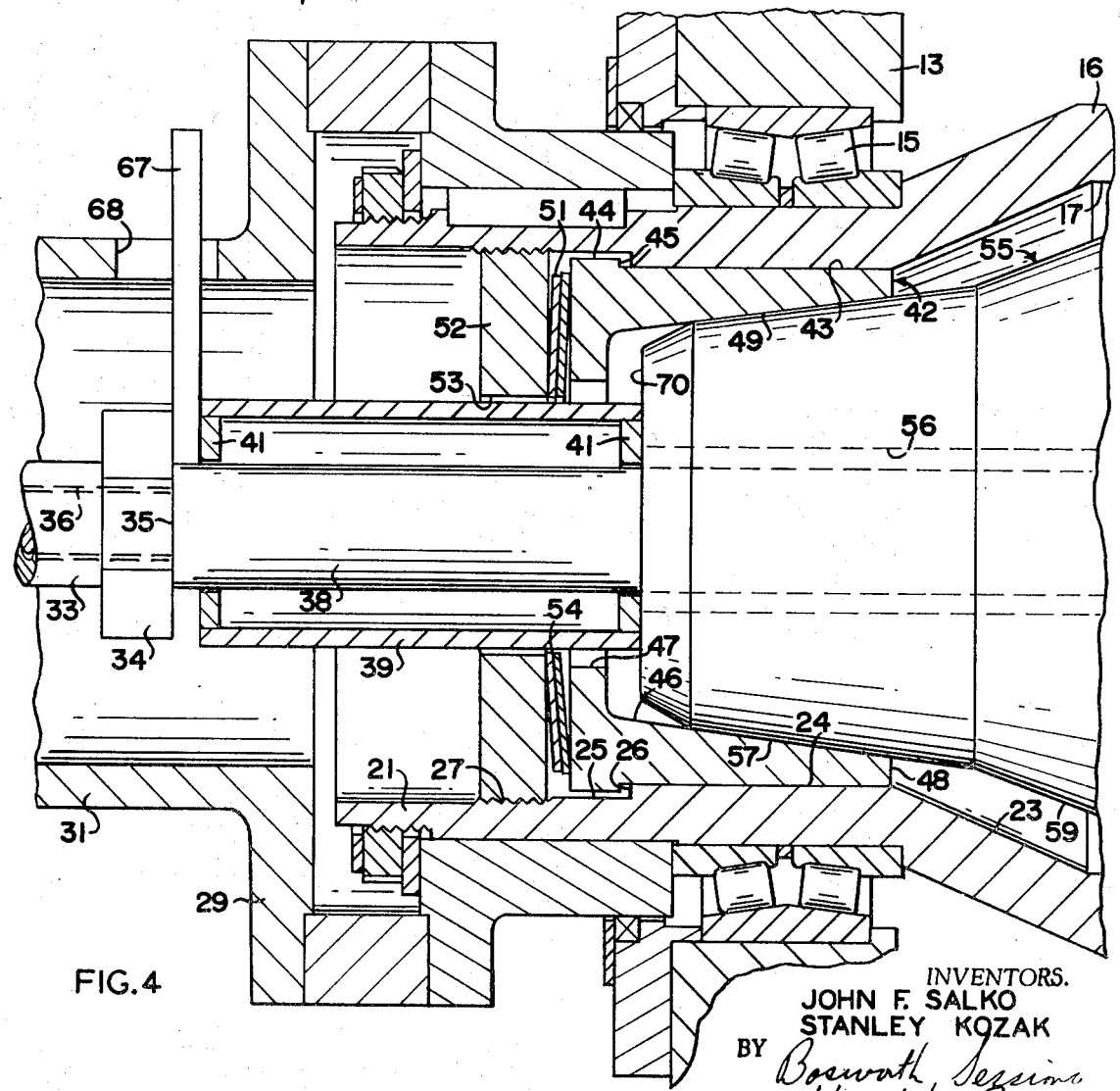
FIG. 4 is a partial elevational view in cross section of a portion of FIG. 2 to an enlarged scale.

Referring now to FIG. 1, reference numeral 1 denotes a frame supporting a take-up reel apparatus of conventional design. The apparatus comprises a drum 2, a transmission unit 3 which rotatably supports the drum, and a motor 4, which positively rotates the drum 2 as required through transmission unit 3. The transmission unit 3 and motor 4 are rigidly mounted on the frame 1 fixed to the floor (not shown). The drum 2 is adapted to carry a coil 5 shown in broken lines. The transmission unit 3 includes a front support 12 and a rear support 13 carried by the frame 1 for supporting the apparatus of this invention (FIGS. 2, 3 and 4). A roller bearing 14 is carried by support 12 and a roller bearing 15 is carried by support 13. The bearings 14 and 15 rotatably support a female quill 16 whose function will be hereinafter explained. The quill 16 is provided with a bore 17 having a frusto-conical inclined portion 18 which is located adjacent the front end 19 of the quill 16. The frusto-conical portion 18 tapers inwardly from the end 19 of the quill and merges into a preferably substantially cylindrical portion 22 which is contiguous with a second conical portion 23 that merges into a second cylindrical portion 24 having an internal diameter less than the internal diameter of the first cylindrical portion 22. The second cylindrical portion 24 is located at the rear end 21 of the quill 16 and it is enlarged slightly at 25 to provide a shoulder 26, the function of which will be hereinafter explained. The internal bore of the enlarged portion 25 is threaded as at 27.

A gear 28 surrounds and is securely affixed to the quill 16 in conventional manner in order that the quill may be positively rotated. The gear 28 is driven by a pinion 6 fixed to a shaft 7 driven by the motor 4.

To enclose the rear end of the quill 16 and to provide means for operating the drum 2, a housing 29 is secured in conventional manner to the rear end 21 of the quill. The housing includes a double acting hydraulic cylinder 31 containing a piston 32 connected to a piston rod 33. Hydraulic fluid is supplied to both sides of the piston 32 through conduits 8 and 9 (FIG. 1) connected to a suitable source of hydraulic fluid under pressure. A nut 34 is affixed to the end 35 of the piston rod 33 to act as a stop member, the function of which will be hereinafter explained.

The end 35 of the piston rod 33 is provided with a threaded opening 36 to receive the threaded end 37 of a conventional drum pull rod 38. The pull rod 38 extends completely through the bore 17 of the quill 16 and functions to expand or contract the drum 2 in a conventional manner, as for example as shown in U.S. Pat. No. 3,116,-891. A sleeve 39 (FIGS. 2, 3 and 4) surrounds the end of the pull rod 38 adjacent the threaded portion 37 and is spaced therefrom. The sleeve 39 carries at its ends washers 41 which are circular and serve to maintain the sleeve 39 spaced from the pull rod 38.

A retainer 42 is positioned within the quill 16 and is provided with a cylindrical portion 43 and a flange portion 44 defining therebetween a shoulder 45. The external diameter of cylindrical portion 43 of the retainer 42 is substantially the same but slightly less than the internal diameter of the second cylindrical portion 24 of the quill 16 in order that the cylindrical portion 43 will side within the second cylindrical portion 24. The diameter of the flange portion 44 is greater than the internal diameter of the second cylindrical portion 24 in order that the shoulder 26 on the interior of the quill 16 will serve as a stop for the retainer. The retainer 42 is provided with a bore 46 which is open at 47 to receive the sleeve 39 and the bore 46 slopes outwardly to its open end 48 thereby providing a frusto-conical bore portion 49, the function of which will be hereinafter explained.

In order to resiliently bias the retainer 42 toward the front end 19 of the quill, a pair of Bellville washers 51 are positioned adjacent the opening 47 of the retainer 42 and in contact with the retainer 42. While Bellville washers are shown, it should be understood that other resilient members may be used. The Bellville washers 51 are retained in the rear end 21 of the quill 16 adjacent but spaced from the opening 47 by a nut 52 threaded into the rear end of the quill at the threaded portion 27. If pressure is not exerted on the retainer in the direction of the rear end of the quill, the Bellville washers 51 will force the retainer 42 toward the front of the quill until the shoulder 45 of the flange of the retainer abuts the shoulder 26 of the quill 16. The nut 52 and the Bellville washers 51 are provided with openings 53 and 54, respectively, of sufficient diameter to receive the sleeve 39 in sliding relationship.

To provide support for the drum 2, a drum spindle 55 on which the drum is carried in conventional manner is inserted into the bore 17 of the quill 16. The spindle 55 has a cylindrical bore 56 through which the pull rod 38 extends. The spindle 55 is provided with a frusto-conical nose 57, the inclination of which corresponds to the inclination of the bore 49 of the retainer 42. A cylindrical body portion 58 of the spindle 55 having an external diameter slightly less than the internal diameter of the cylindrical portion 22 of the female quill 15 is joined to the nose 57 by an inwardly tapering portion 59 which, when the drum spindle 55 is assembled within the quill, is located in the vicinity of the tapering portion 23 of the quill 16. The external configuration of the body portion 58 may be other than cylindrical. The drum end portion 61 of the drum spindle 55 is tapered outwardly in a frustoconical configuration and is provided with a keyway 62 to receive a key 63, which key is retained in a keyway 64 machined into the front end 19 of the quill. The inclination of the drum end portion 61 of the drum spindle is substantially identical to the inclination of the frustoconical portion 18 of the quill 16. A flange 65 is provided around the end portion 61 of the drum spindle.

In the assembly of the spindle into the quill, the nose 57 will slide into the bore 49 of the retainer 42 and it will be firmly seated therein. Further movement of the spindle 55 will move the retainer toward the housing 29 against the force exerted by the Bellville washers 51. The length of the spindle is such that when the spindle nose is firmly seated in the retainer 42 with the washers somewhat compressed, the conical drum end portion 61 will be firmly seated in the correspondingly shaped portion 18 of the quill 16. Since the retainer 42 is slideable in the quill against the action of the Belleville washers, the distance between tapered surfaces 57 of the nose and 61 at the drum end of the spindle is required to be held only within ordinary machining tolerances. The permissible movement of the retainer will accommodate reasonable variations in the distance between the two tapers.

When the drum is to be replaced, the pull rod 38 is moved to release the segments of the drum 2 and the nut 69 securing the pull rod to the drum is disconnected, thereby freeing the drum spindle 55 from the holding action of the pull rod 38. The Bellville washers 51 will exert pressure on the retainer 42 moving it toward the front end of the female quill 16. This movement of the retainer 42 will force the drum spindle 55 slightly out of the quill 16 freeing the drum end portion 61 from complete contact with the frusto-conical portion 18 of the quill, thereby permitting quick removal of the drum spindle 55 from the quill. If difficulty is experienced in removing the spindle 55, a push bar 67 may be inserted into an opening 68 in the housing 29. The opening 68 is substantialy aligned with the sleeve 39. When the push bar 67 is inserted until it rests on the pull rod 38, the hydraulic cylinder 31 is actuated to move the piston rod 33 and nut 34 in the direction of the quill 16. The nut 34 will force the push bar 67 into contact with one of the washers 41 of the sleeve 39 moving the sleeve 39 in the direction of the quill thereby bringing the other washer 41 into contact with the front end 70 of the drum spindle and forcing it out of the quill. It is thus possible to very quickly remove the spindle from the female quill. If desired, the push bar may be eliminated and in such event, the nut 34 can be brought into contact with the sleeve to move it toward the quill to release the spindle.

In assembling the quill and spindle of this invention the spindle with the drum 2 affixed thereto is inserted into the quill with the pull rod 38 extending through the bore 56 of the drum spindle 55. The nut 69 is affixed to the end of the pull rod 38 and fluid is supplied to the cylinder 31 through conduit 9 to move the piston 32 and piston rod 33 to the left as in FIGS. 2 and 3. Movement of the piston rod 33 and pull rod 38 attached thereto will pull the drum spindle 55 into the quill 16 thereby seating the same within the quill.

It can be seen from the foregoing that the drum spindle and quill design of this invention may be more readily assembled and disassembled to permit a more rapid change of drum sizes. During this assembly of the spindle from the quill the spring loaded retainer materially aids in releasing the spindle from the quill by moving in the direction of the open end of the quill. If difficulty is experienced in removing the spindle, all that is required in this invention is to move the pull rod nut against the push bar and the sleeve to force the spindle out of the quill. The taper on the nose of the drum and the tapered bore of the retainer materially assist in seating the spindle within the quill. The spring loaded retainer will permit sufficient movement during assembly of the spindle and quill to compensate for reasonable machining error in holding the distance between the taper of the bore and the taper of the nose of the spindle.

It can be seen from the foregoing that various modifications may be made in the quill and spindle design of this invention without departing from the spirit and scope of the appended claims.

We claim:

1. In a pay-off or take-up reel apparatus having a drum for supporting a coil of metal strip, a drum spindle having a body portion, an inwardly tapering nose portion, an outwardly tapering drum end portion and a central bore, a female quill having a bore adapted to receive said body portion and having a front tapering portion adapted to fit the outwardly tapering drum end portion of said spindle, a retainer in the rear portion of said bore having a tapering bore corresponding substantially to the taper of said nose portion, compressible means urging said retainer into contact with said nose portion, a pull rod extending through the bore of said drum spindle, means for reciprocating said pull rod, and means movable by said pull rod and adapted to engage a portion of said drum spindle whereby the drum spindle may be released from the bore of said female quill by movement of said pull rod in one direction.

2. In a pay-off or take-up reel apparatus as set forth in claim 1 wherein a reciprocating piston rod is secured to the end of said pull rod, a stop member is positioned on the end of said piston rod and means are provided between said stop member and said sleeve to force said sleeve into contact with the nose portion of said drum spindle upon actuation of said piston rod.

3. A spindle for reel drums comprising a female quill rotatably mounted in a frame, means for rotating said quill, said quill having a first cylindrical bore portion, an outwardly tapering bore portion merging with one end of said cylindrical bore portion, an inwardly tapering bore portion merging with the other end of said cylindrical bore portion, a second cylindrical bore portion having an internal diameter less than the internal diameter of said first cylindrical bore portion and merging with said inwardly tapering bore portion, a drum spindle positioned within said quill bore portions, said drum spindle having an inwardly tapering nose portion, a cylindrical body portoni of an external diameter slightly less than the internal diameter of said first cylindrical bore portion, and an outwardly flaring drum end portion having a taper substantially identical to the outwardly tapering bore portion of said female quill, said drum spindle having a cylindrical bore, a retainer in said second cylindrical bore portion, said retainer having a tapering bore corresponding to the taper of the nose portion of said drum spindle, spring means urging said retainer into contact with said nose, a drum pull rod extending through said spindle, said retainer and said spring means, means for reciprocating said pull rod, and a sleeve surrounding a portion of said pull rod and extending through said retainer and spring means, said sleeve having an external diameter greater than the diameter of said bore through said drum spindle whereby force exerted on said sleeve will be exerted on said nose portion.

4. A spindle for reel drums according to claim 3 wherein said spring means comprises a pair of Bellville washers retained in said second cylindrical bore portion.

5. A spindle for reel drums according to claim 3 wherein stop means are provided on said pull rod between said sleeve and said reciprocating means, said stop means being constructed and arranged to force said sleeve into contact with said nose portion.

References Cited

UNITED STATES PATENTS 3,294,338  12/1966  O'Brien _____ 242—78.1

NATHAN L. MINTZ, Primary Examiner